(12) United States Patent
Kumagai et al.

(10) Patent No.: US 6,624,965 B1
(45) Date of Patent: Sep. 23, 2003

(54) RECORDING AND/OR REPRODUCING APPARATUS INCLUDING CASSETTE MOUNTING DEVICE

(75) Inventors: Kiyoshi Kumagai, Kawasaki (JP); Osamu Nagatsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/713,667

(22) Filed: Nov. 15, 2000

Related U.S. Application Data

(62) Division of application No. 09/129,552, filed on Aug. 5, 1998, now Pat. No. 6,198,596.

(30) Foreign Application Priority Data

| Sep. 9, 1997 | (JP) | 9-243854 |
| Aug. 22, 1997 | (JP) | 9-226202 |
| Aug. 22, 1997 | (JP) | 9-226203 |
| Aug. 29, 1997 | (JP) | 9-234140 |

(51) Int. Cl.⁷ .......................... G11B 15/675
(52) U.S. Cl. .................. 360/96.5; 360/96.6
(58) Field of Search ............. 360/96.1, 96.5, 360/96.6; 242/338, 338.4

(56) References Cited

U.S. PATENT DOCUMENTS

| 4,794,478 | A | * | 12/1988 | Kamezawa et al. | 360/96.6 |
| 5,124,854 | A | * | 6/1992 | Iyota et al. | 360/96.6 |
| 5,450,259 | A | * | 9/1995 | Cho et al. | 360/96.6 |
| 5,481,419 | A | * | 1/1996 | Fujishiro | 360/96.5 |
| 5,737,148 | A | * | 4/1998 | Lee et al. | 360/96.5 |
| 5,815,341 | A | * | 9/1998 | Hwang et al. | 360/96.6 |
| 6,038,100 | A | * | 3/2000 | Nagatsuka | 360/96.6 |
| 6,198,596 | B1 | * | 3/2001 | Kumagai et al. | 360/96.5 |

FOREIGN PATENT DOCUMENTS

| JP | 6-176457 | * | 6/1994 | 360/96.6 |

* cited by examiner

*Primary Examiner*—David L. Ometz
(74) *Attorney, Agent, or Firm*—Robin, Blecker & Daley

(57) ABSTRACT

A cassette mounting device comprises a cassette holder into which to insert a cassette, a pair of link mechanisms disposed on lateral opposed sides of the cassette holder so that the cassette holder is supported for upward and downward movement with respect to a chassis, and a fixing member which fixes each of the pair of link mechanisms to the chassis, the fixing member clamping each of the pair of link mechanisms turnably with respect to the chassis.

25 Claims, 16 Drawing Sheets

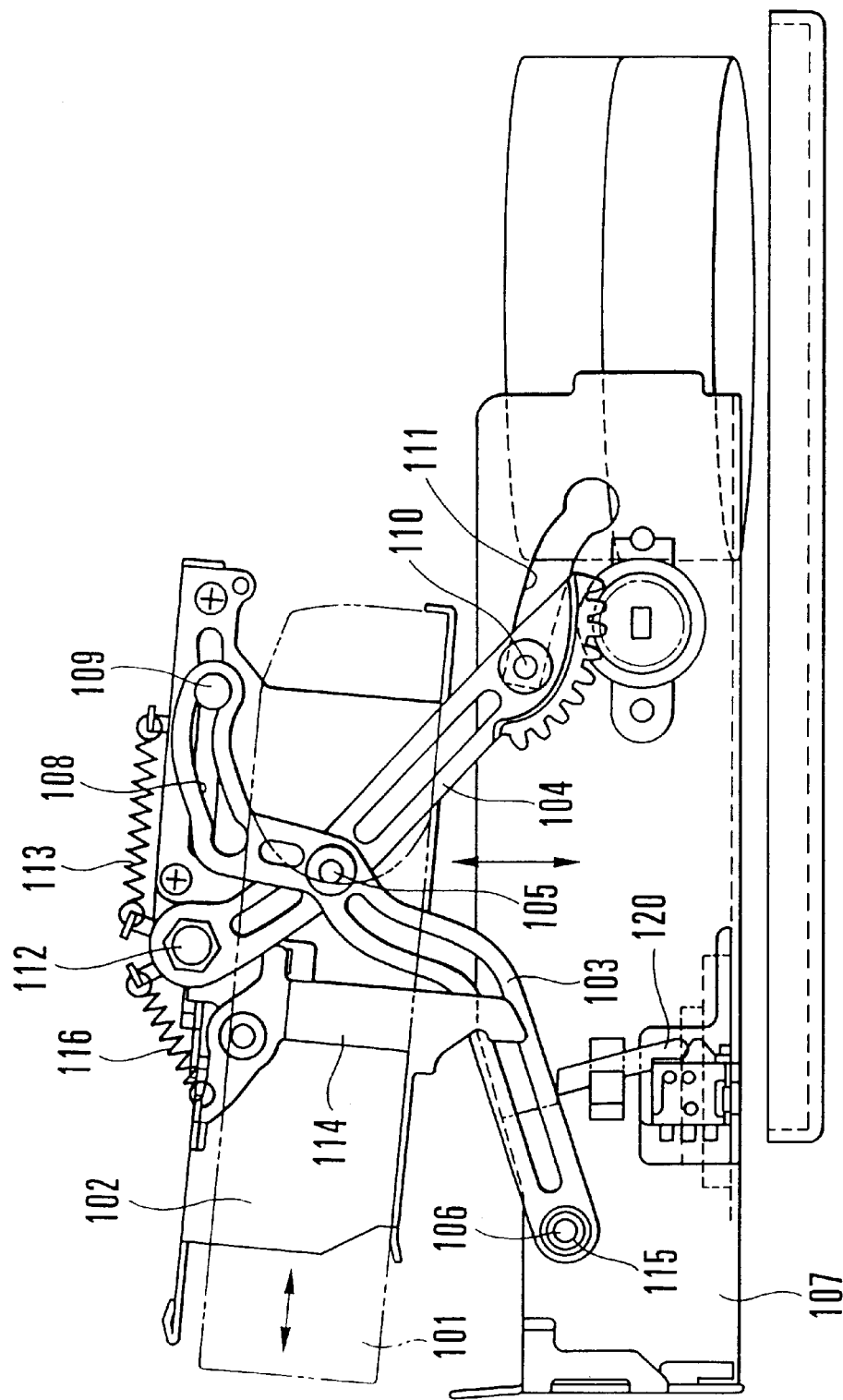

RECORDING AND/OR REPRODUCING APPARATUS INCLUDING CASSETTE MOUNTING DEVICE

CROSS-REFERENCE TO RELATED APPLICATIONS

This application is a divisional of application Ser. No. 09/129,552, filed Aug. 5, 1998 now U.S. Pat. No. 6,198,596.

BACKGROUND OF THE INVENTION

1. Field of the Invention

The present invention relates to a cassette mounting device which moves up or down a cassette holder in which a tape cassette is inserted, and to a recording and/or reproducing apparatus such as a VCR (video cassette recorder) including such cassette mounting device.

2. Description of Related Art

FIG. 21 shows one example of a recording and/or reproducing apparatus including a conventional cassette mounting device. The example shown in FIG. 21 includes a cassette holder 102 into which to insert a cassette 101, and a pair of levers 103 and 104 which are turnably connected to each other by a shaft 105 and constitute a link. One end of the lever 103 is turnably supported in a hole 115 provided in a chassis 107, by a shaft 106, while the other end of the lever 103 is slidably engaged with a shaft 109 of the cassette holder 102 by means of a slot 108. The shaft 106 is turnably secured to the chassis 107 by a snap ring. One end of the lever 104 is slidably engaged with a slot 111 of the chassis 107, while the other end of the lever 104 is turnably supported on the cassette holder 102 by a connecting member 112 which connects the link to a link (not shown) provided on the opposite side of the cassette holder 102.

The example shown in FIG. 21 also includes an upward urging spring 113 which is disposed in tension between the lever 103 and the lever 104, a lock lever 114 which, when the cassette holder 102 is moved to its down position, engages with a lock member 120 provided on the chassis 107 and holds the cassette holder 102 at the down position, and a spring 116 which urges the lock lever 114 to turn clockwise.

When the cassette 101 is inserted into the cassette holder 102 and the cassette holder 102 is pressed, the cassette holder 102 moves down by the link action of the levers 103 and 104. If the cassette holder 102 is released from its locked state at the down position, the levers 103 and 104 are moved by the spring 113 so that the cassette holder 102 moves upward.

In this conventional cassette mounting device, since the connecting member 112 is provided at one end of the lever 104, the lever 104 is connected to a lever which constitutes the like provided on the opposite side of the cassette holder 102 (i.e., a lever which is not shown in FIG. 21 and corresponds to the lever 104), and the cassette holder 102 can be held at the down position in an approximately horizontal state.

However, in the process of assembling the above-described conventional apparatus, when the cassette holder 102 is to be secured to the chassis 107, the shaft 106 provided at one end of the lever 103 is inserted into the hole 115 of the chassis 107 and a snap ring or the like is fitted onto the shaft 106. Accordingly, assembling operations need to be separately performed on the opposite sides of the cassette holder 102, and a larger number of assembling steps are needed.

In addition, when the cassette holder 102 is to be secured to the chassis 107, it is necessary to slide the extending end of the shaft 106 into the inside of the chassis 107 while appropriately bending the lever 103 by using its elasticity with extreme care without deforming the lever 103. This work is also time-consuming.

BRIEF SUMMARY OF THE INVENTION

It is, therefore, an object of the present invention to provide a cassette mounting device which allows a cassette holder to be easily and safely secured to a chassis, and a recording and/or reproducing apparatus including such cassette mounting device.

To achieve the above object, in accordance with one aspect of the present invention, there is disclosed a cassette mounting device which comprises a cassette holder into which to insert a cassette, a pair of link mechanisms disposed on lateral opposed sides of the cassette holder so that the cassette holder is supported for upward and downward movement with respect to a chassis, and a fixing member which fixes each of the pair of link mechanisms to the chassis, the fixing member clamping each of the pair of link mechanisms turnably with respect to the chassis.

In accordance with another aspect of the present invention, there is disclosed a cassette mounting device which comprises a cassette holder into which to insert a cassette, a pair of link mechanisms disposed on lateral opposed sides of the cassette holder so that the cassette holder is supported for upward and downward movement with respect to a chassis, and a connecting member for causing the pair of link mechanisms to move at the same time, wherein the connecting member and link members of the pair of link mechanisms are integrated and supported turnably with respect to the chassis.

In accordance with another aspect of the present invention, there is disclosed a cassette mounting device which comprises a cassette holder into which to insert a cassette, a pair of link mechanisms disposed on lateral opposed sides of said cassette holder so that the cassette holder is supported for upward and downward movement with respect to a chassis, a lock lever which locks the cassette holder at a down position thereof, and a spring which urges the lock lever to turn, the spring being disposed in a gap between the cassette and an inside of the cassette holder.

In accordance with another aspect of the present invention, there is disclosed a cassette mounting device which comprises a cassette holder into which to insert a cassette, a link mechanism which supports the cassette holder for upward and downward movement with respect to a chassis between an up position and a recording/reproducing position, a lid opener capable of opening a front lid of the cassette during a cassette mounting operation, and a stopper which selectively restricts the cassette mounting operation according to whether the cassette is inserted correctly or incorrectly.

The above and other objects and features of the present invention will become apparent from the following detailed description of a preferred embodiment thereof taken in conjunction with the accompanying drawings.

BRIEF DESCRIPTION OF THE SEVERAL VIEWS OF THE DRAWING

FIG. 21 is a side view of a recording and/or reproducing apparatus including the conventional cassette mounting device.

DETAILED DESCRIPTION OF THE INVENTION

A cassette mounting device according to the present invention and a preferred embodiment of a recording and/or reproducing apparatus including such cassette mounting device will be described below with reference to the accompanying drawings.

Figure 1:
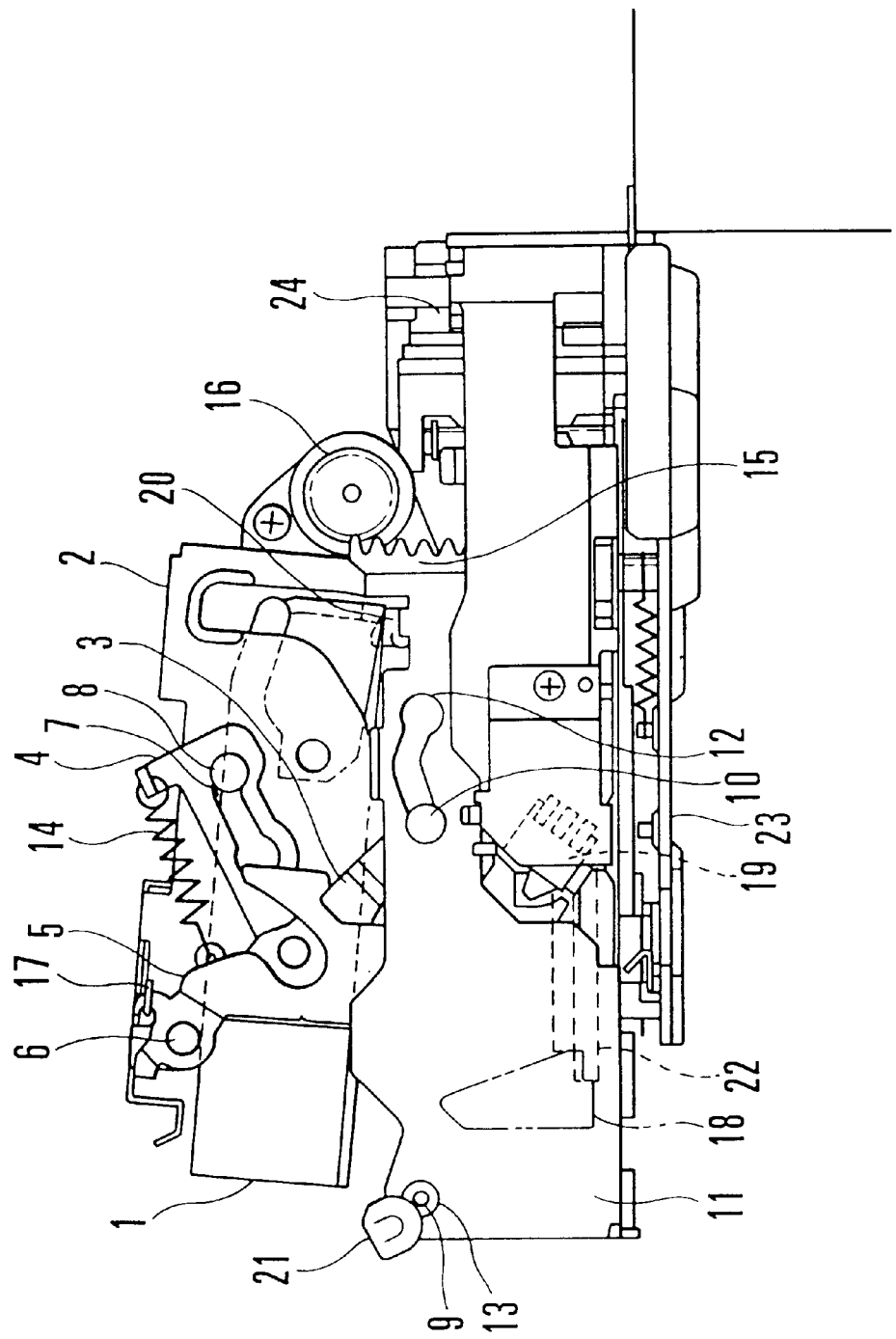
FIG. 1 is a side view showing the state of a VCR when a cassette holder is located at its up position, the VCR being provided with a cassette mounting device according to an embodiment of the present invention.
Figure 2:
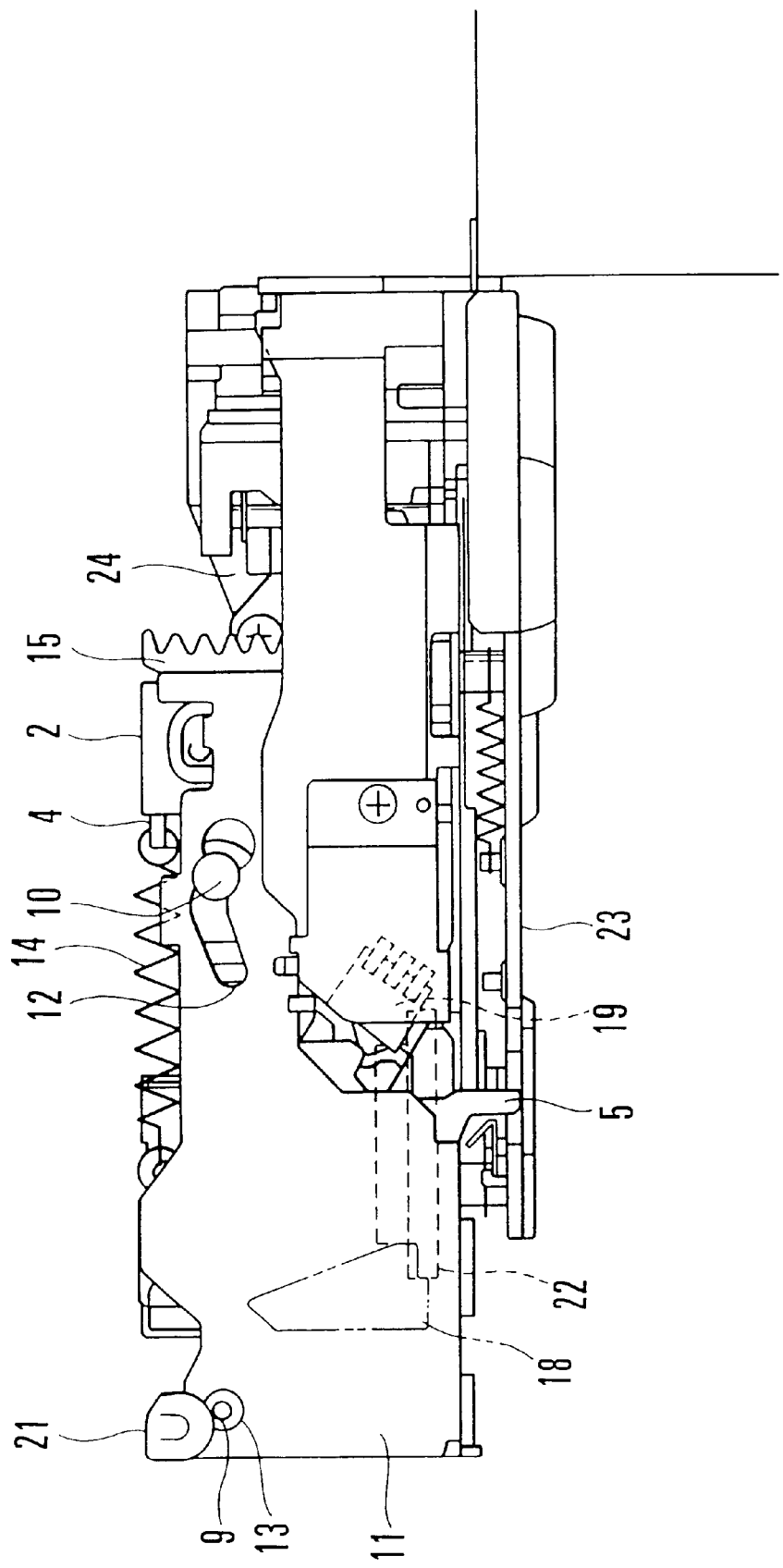
FIG. 2 is a side view showing the state of the VCR according to the embodiment of the present invention when the cassette holder is located at its down position.
Figure 3:
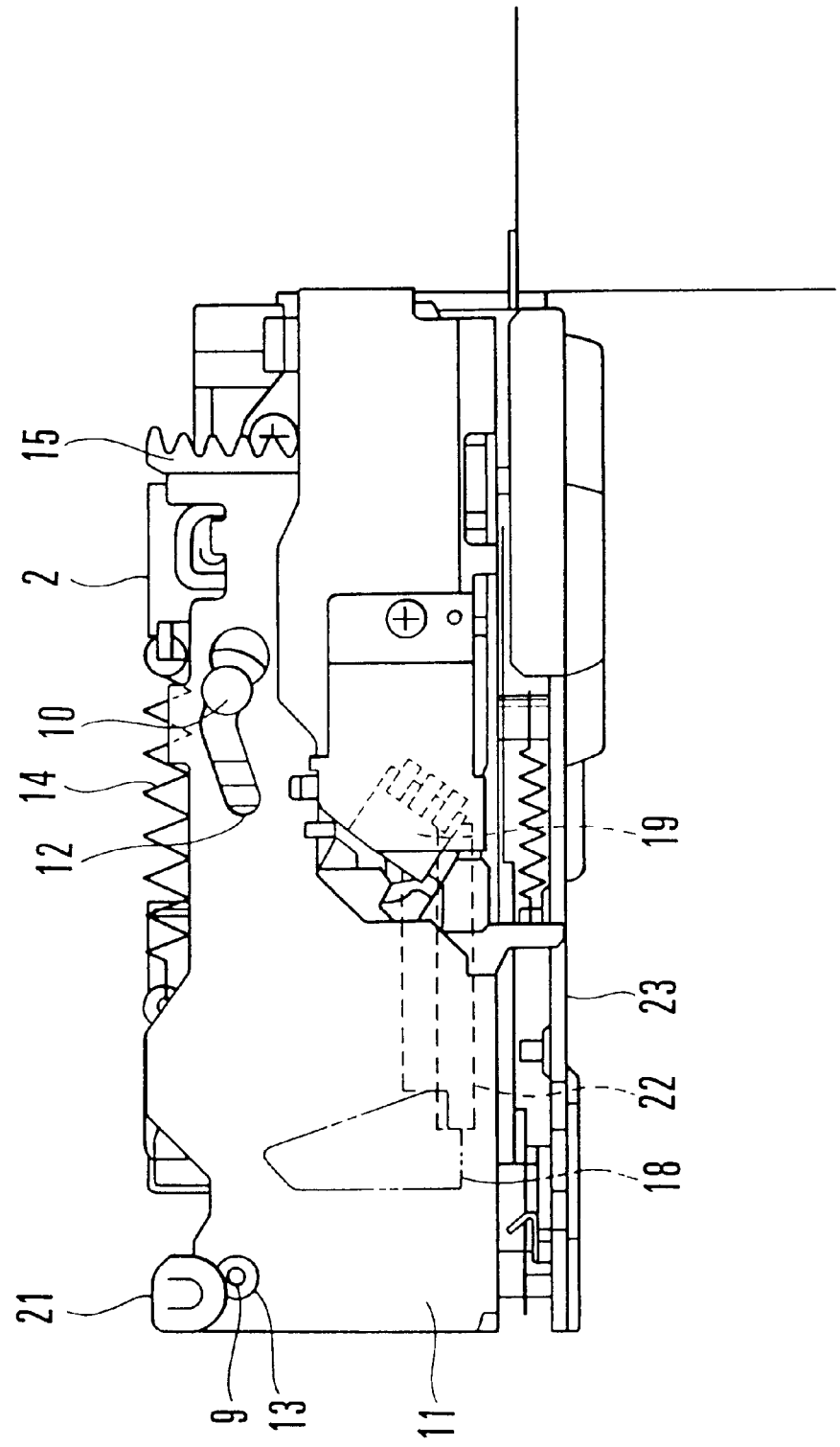
FIG. 3 is a side view showing a recording/reproducing state in which a movable base of the VCR according to the embodiment of the present invention has been moved.
Figure 4:
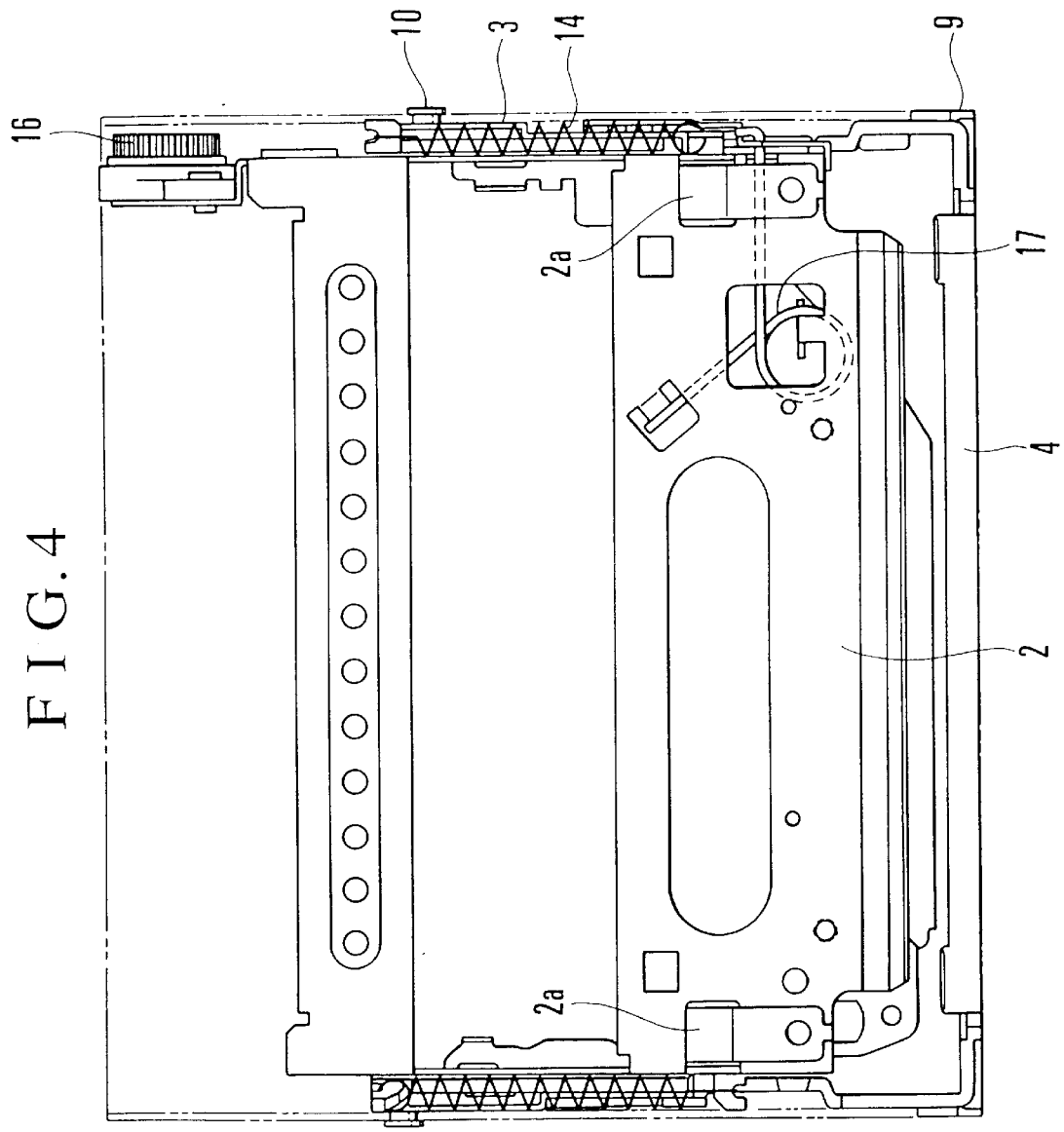
FIG. 4 is a plane view of the cassette mounting device according to the embodiment of the present invention.
Figure 5:
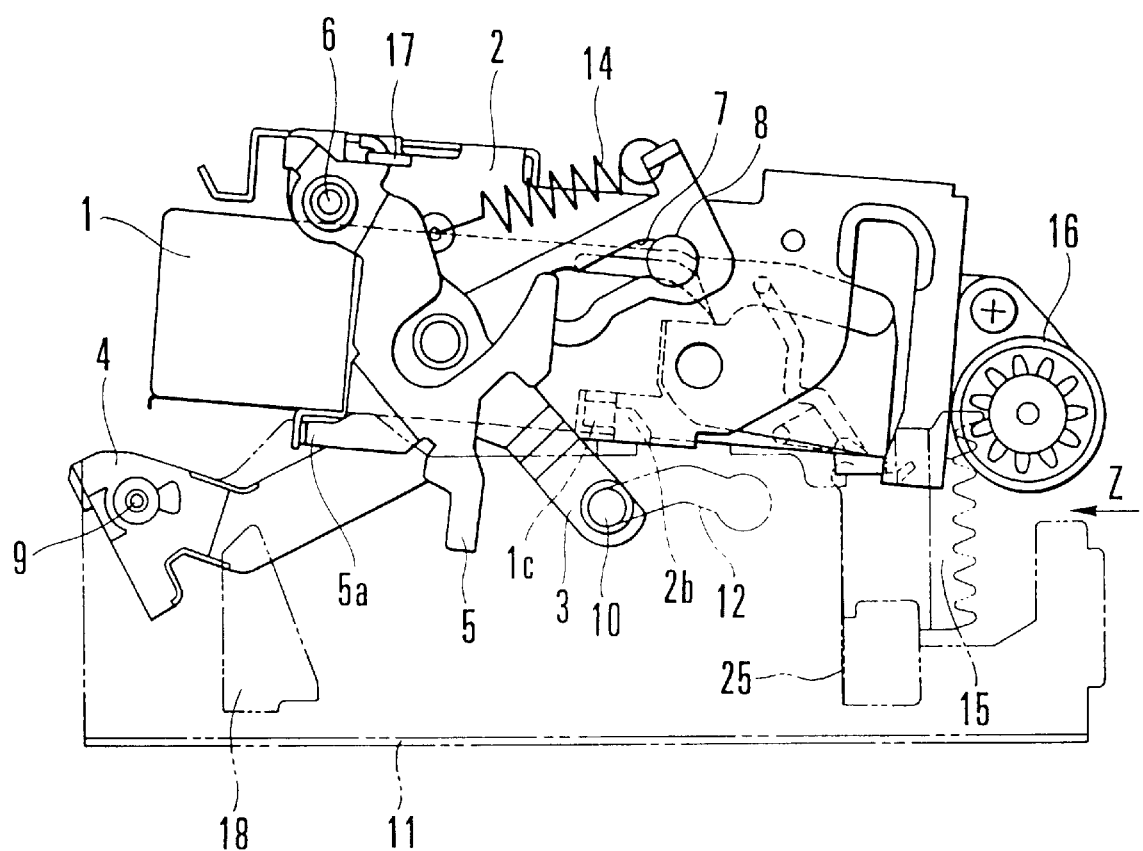
FIG. 5 is a side view showing one side of the cassette mounting device according to the embodiment of the present invention.
Figure 6:
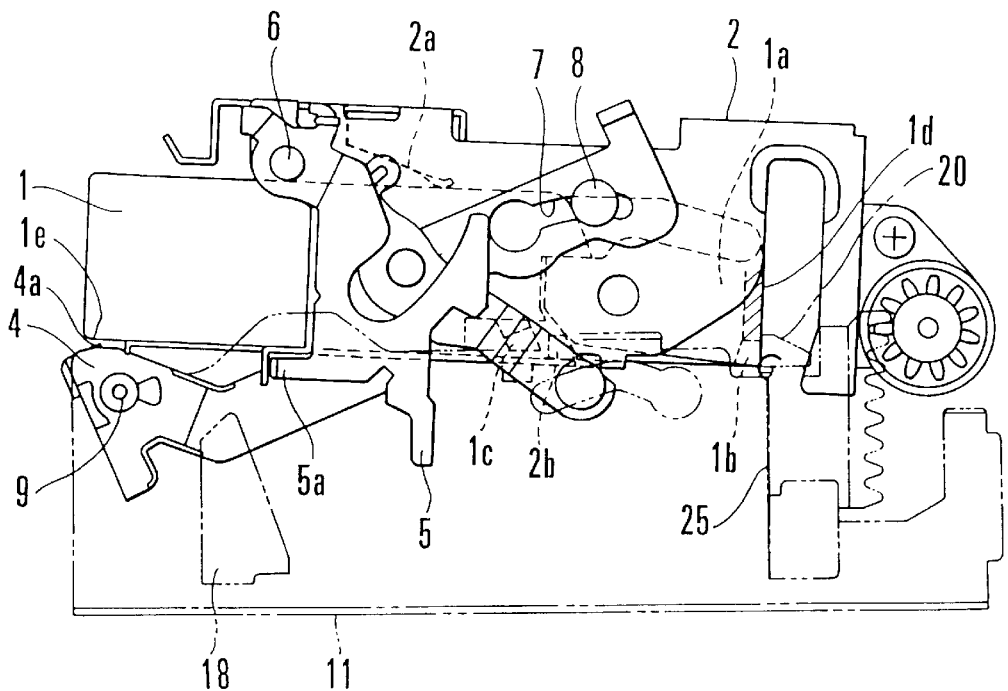
FIG. 6 is a side view showing the one side of the cassette mounting device which is moving downwardly with a cassette being not correctly inserted in the embodiment of the present invention.
Figure 7:
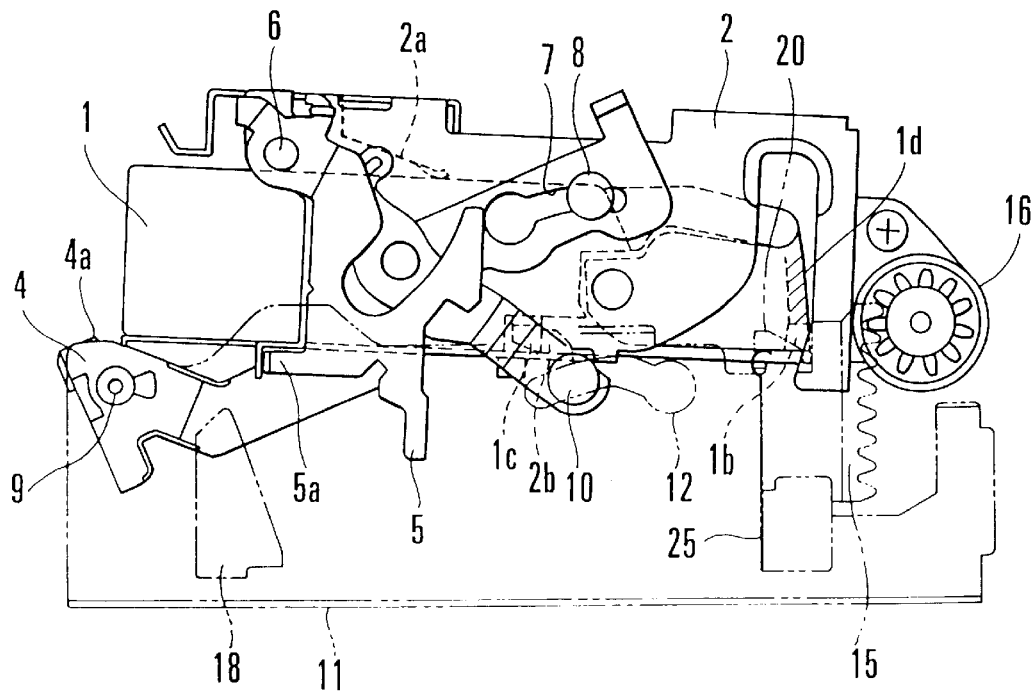
FIG. 7 is a side view showing the one side of the cassette mounting device which is moving downwardly with a cassette being correctly inserted in the embodiment of the present invention.
Figure 8:
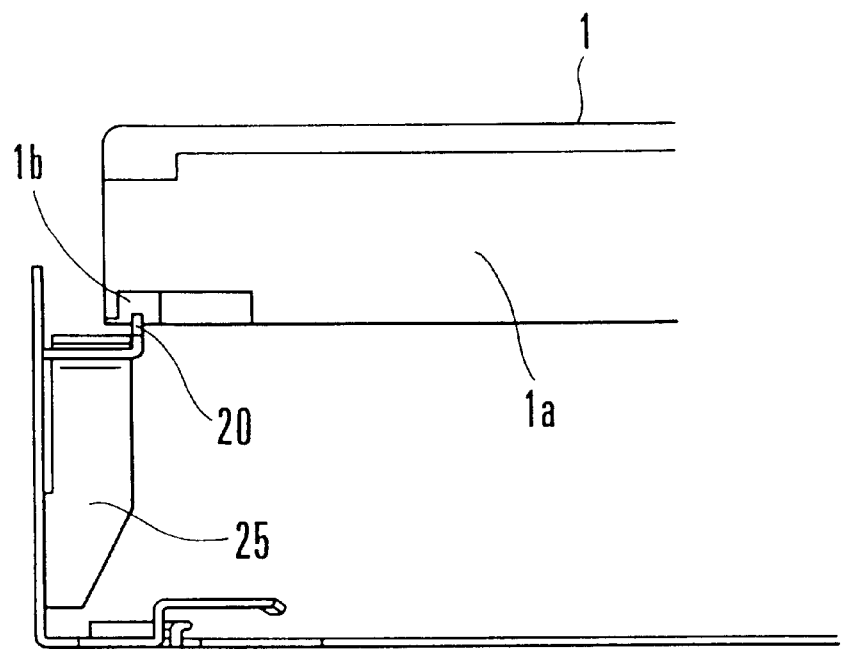
FIG. 8 is a schematic side view taken in the direction of an arrow Z of FIG. 5.
Figure 9:
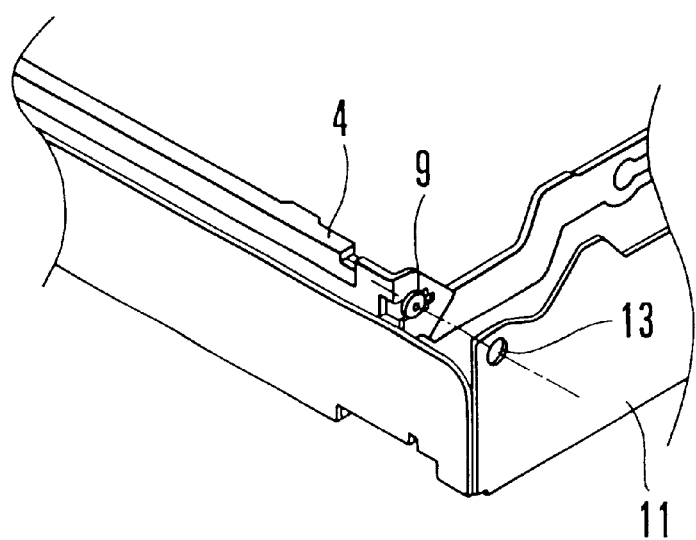
FIG. 9 is a schematic view of a portion at which a connecting member and the movable base are fixed to each other in the embodiment of the present invention.
Figure 10A:
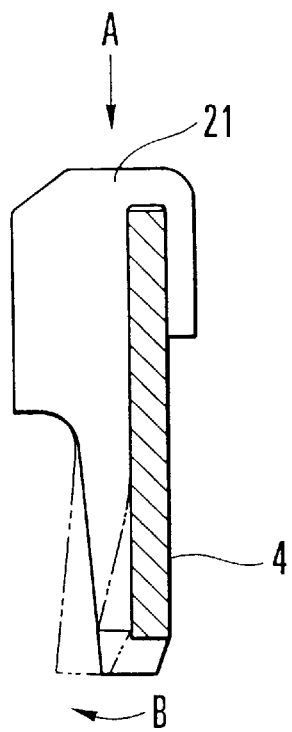
FIGS. 10A and 10B are cross-sectional views of the portion at which the connecting member and the movable base are fixed to each other in the embodiment of the present invention.
Figure 10B:
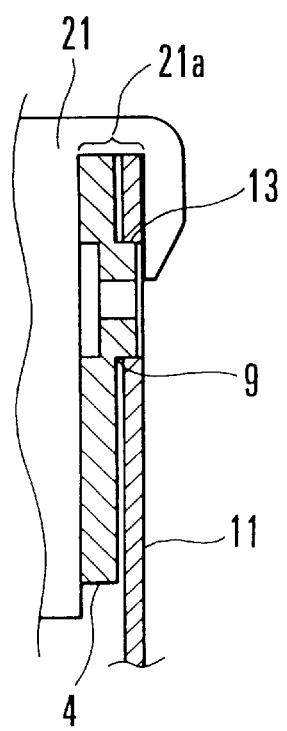

FIGS. 1 to 3 are side views showing different states of a VCR provided with a cassette mounting device according to the present invention, FIG. 4 is a plane view of the cassette mounting device, FIG. 5 is a side view showing one side of the cassette mounting device which lies at a cassette insertion position (in a popped-up state), FIG. 6 is a side view showing the cassette mounting device which is moving downwardly with a cassette being incompletely inserted, FIG. 7 is a side view showing the cassette mounting device which is moving downwardly with a cassette being correctly inserted, FIG. 8 is a schematic side view taken in the direction of an arrow Z of FIG. 5, FIG. 9 is a schematic view of a portion at which a connecting member and a movable base are secured to each other, and FIGS. 10A and 10B are cross-sectional views of the state in which a fixing member for fixing the connecting member to the movable base is secured.

The cassette mounting device shown in FIGS. 4 and 5 includes a cassette holder 2 into which to insert a cassette 1, a lever 3 which constitutes part of a link, a connecting member 4 which turnably supports the cassette holder 2 on a chassis and constitutes part of the link, a lock lever 5, and a shaft 6 which is provided on a side of the cassette holder 2 and turnably supports the lever 3 and the lock lever 5. A cam slot 7 is provided in the connecting member 4, and a shaft 8 is provided on the side of the cassette holder 2 is slidably engaged with the cam slot 7. As seen in FIGS. 4, 5 and 9 the connecting member or link part 4 is a supporting member having at its ends respective link parts which lie adjacent opposing sides of the base 1 land each of which has an engaging part in the form of a projection 9 (a concave or hole can also be used) for rotatably supporting the respective link part to the side plate. The support member part 4 is provided with an interconnecting part which extends between and interconnects the link parts together for synchronizing the parts. As can be appreciated, in the present case, the link parts are formed by bending the member 4 at opposite ends at a right angle. A shaft 10 is provided on the lever 3 and is slidably engaged with a cam slot 12 provided in a movable base 11.

Referring to FIGS. 1 to 3, the movable base 11 constitutes a sub-chassis similarly to that used in the arrangement shown in FIGS. 4 and 5, and a hole 13 is provided in the movable base 11 and turnably supports the connecting member 4 of the cassette mounting device. A spring 14 is disposed in tension between the lever 3 and the connecting member 4 and urges the cassette holder 2 to move toward its up position. A gear 15 which is provided on the movable base 11 is arranged to mesh with a damper 16 secured to the cassette mounting device and produce a load due to the viscous resistance of oil contained in the damper 16, during the upward movement of the cassette holder 2, thereby smoothing the upward movement of the cassette holder 2.

Referring back to FIGS. 4 and 5, a lock lever spring 17 urges the lock lever 5 to turn clockwise as viewed in FIG. 5. The lock lever spring 17 is secured to an erect portion which extends downwardly from the top plate of the cassette holder 2. This erect portion faces a dead space which is produced when the front lid of the cassette 1 is opened with the cassette 1 located at its down position. The movable base 11 is provided with a lock member 18 and a lock detection switch 19 (refer to FIG. 1), and a locking portion 5a of the lock lever 5, when it is moved to its down position, can engage with the lock member 18 and also can press the lock detection switch 19.

In this embodiment, the lock lever spring 17 is disposed in a gap between the cassette 1 and the inside of the cassette holder 2. As shown in FIG. 4, the lock lever spring 17 is a torsion coil spring, and its central axis is approximately perpendicular to the turning axis of the lock lever 5. Since the lock lever spring 17 is disposed inside the cassette holder 2 in this manner, there is no risk that a user's hand touches the lock lever spring 17.

Referring to FIGS. 6 and 7, a stopper 20 is integrally provided on the movable base 11. As shown in FIG. 7, if the cassette 1 is completely inserted into the cassette holder 2, the stopper 20 enters an opening 1b of a front lid 1a of the cassette 1 and does not interfere with the cassette 1 (refer to FIG. 8). At this time, a front-lid unlocking portion 2b for the cassette 1, which is integrally provided on the cassette holder 2, turns a front-lid lock lever 1c of the cassette 1 clockwise and releases the locked state of the front lid 1a.

As shown in FIG. 6, if the cassette 1 is not completely inserted in the cassette holder 2, the locked state of the front lid 1a is not released and the stopper 20 interferes with a front plate portion 1d of the cassette 1 to prevent the cassette 1 from entering further. At this time, a rear end portion 1e of the cassette 1 interferes with an upper end portion 4a of the connecting member 4 to prevent the cassette 1 from moving down when it is located at an incorrect position, thereby preventing the cassette 1 from interfering with another component part such as a tape guide post on the movable base 11.

As shown in FIG. 9, the column-shaped projection 9 is formed on an end face of the connection member 4 to serve as the turning axis thereof, and the periphery of the projection 9 is engaged with the hole 13 or engaging portion provided in the movable base 11 and turnably supports the connecting member 4, i.e., supports the cassette mounting device for upward and downward movement.

FIGS. 10A and 10B are cross-sectional views of a fixing member or clipping part 21 for fixing the connecting member 4 and the movable base 11. The fixing member 21 is a component part made of plastic, and as shown in FIG. 10A, when the fixing member 21 is fitted onto the connecting member 4 in the direction of an arrow A, the fixing member 21 is secured to the connecting member 4 after having slid over the connecting member 4 in the same direction while being elastically bent in the direction of an arrow B. The fixing member 21 can turn integrally with the movable base 11. In addition, as shown in FIG. 10B, the connecting member 4 and the movable base 11 are clamped by a support portion 21a of the fixing member 21 so that the cassette mounting device can be turnably supported on the movable base 11 in the state of being securely fastened to the movable base 11.

As shown in FIGS. 1 to 3, component parts, such as a reel mount 22 on which to mount the cassette 1, are provided on the movable base 11. The movable base 11 is disposed for forward and rearward sliding movement on a fixed base 23 which is a main chassis. A rotary drum device 24 is obliquely disposed on the fixed base 23.

In the above-described arrangement, if the cassette holder 2 is pressed from above with the cassette 1 being inserted in the cassette holder 2 as shown in FIG. 1, the shaft 10 provided on the lever 3 and the shaft 8 provided on the side of the cassette holder 2 are respectively move along the cam slot 12 provided in the movable base 11 and along the cam slot 7 provided in the connecting member 4, and the cassette holder 2 moves downwardly.

With the downward movement of the cassette holder 2, the locking portion 5a of the lock lever 5 comes into abutment with the lock member 18 of the movable base 11 so that the lock lever 5 is turned counterclockwise and the lock lever spring 17 is charged. Then, when the locking portion 5a passes a corner portion of the lock member 18, the lock lever spring 17 is released from its charged state and the lock lever 5 turns clockwise so that the locking portion 5a engages with the lock member 18. At the same time, the lock lever 5 presses the lock detection switch 19.

In this manner, the cassette holder 2 is locked at the down position as shown in FIG. 2. In this state, the cassette 1 in the cassette holder 2 is mounted on the reel mount 22 of the movable base 11 and the cassette 1 is pressed by cassette pressure springs 2a (refer to FIG. 2).

Then, if the lock detection switch 19 is turned on, the movable base 11 relatively slides with respect to the fixed base 23 toward the rotary drum device 24 as shown in FIG. 3, and part of the rotary drum device 24 is relatively inserted into the opening 1b of the cassette 1. When the rotary drum device 24 is inserted in this manner and tape is drawn from the cassette 1 by a tape guide and the like (although not shown), the tape is helically wrapped around the rotary drum device 24 and a predetermined tape path is formed. Then, the tape starts running and a predetermined signal is recorded or reproduced on or from the tape by rotary heads or the like.

Then, if an eject command is issued, the movable base 11 is slid away from the rotary drum device 24 from the position shown in FIG. 3 to the position shown in FIG. 2, and the tape is unloaded. When the lock lever 5 turns counterclockwise and the locked state is released in the state shown in FIG. 2, each of the lever 3 and the connecting member 4 moves from the position shown in FIG. 2 to the position shown in FIG. 1 by the force of the spring 14 in a manner opposite to the above-described one. Thus, the cassette holder 2 moves up so that the cassette 1 can be removed from the cassette holder 2.

Figure 11A:
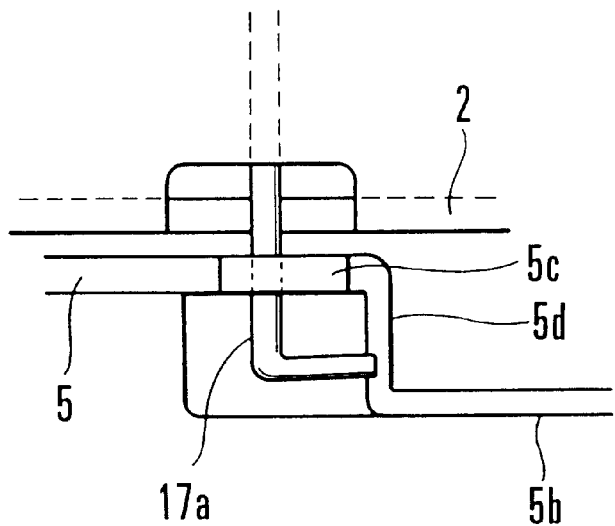
FIGS. 11A and 11B are schematic explanatory views of an essential portion of the present embodiment.
Figure 11B:
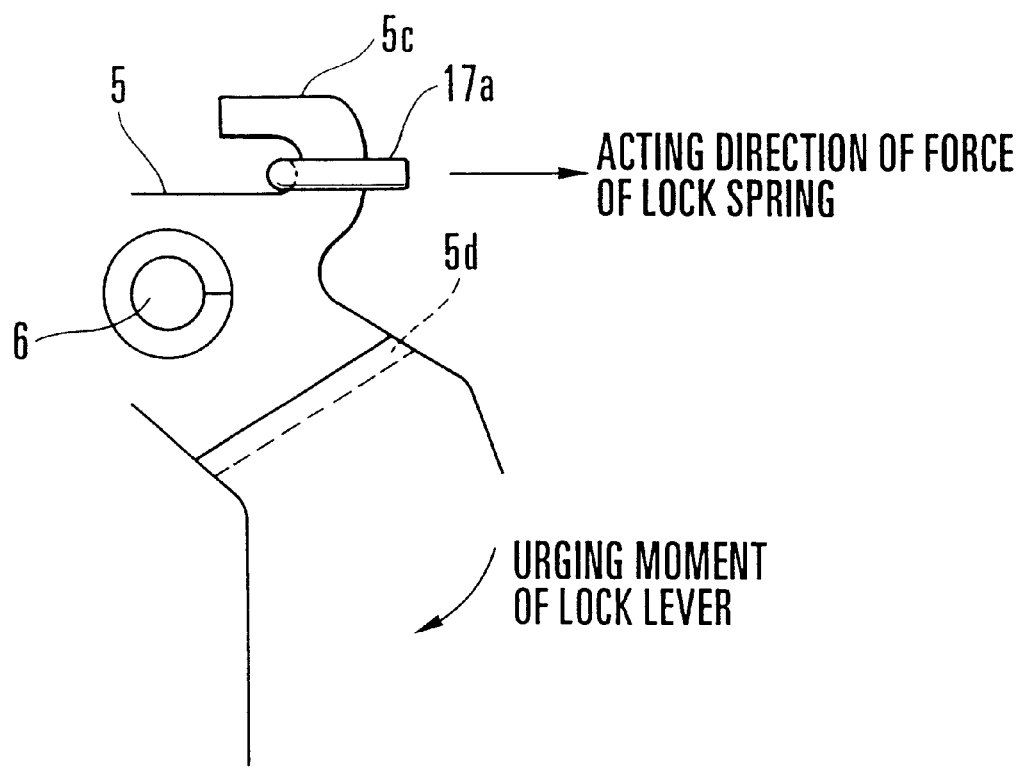

The lock lever 5 and its associated portions will be described below with reference to FIGS. 11A, 11B and FIGS. 12A, 12B. As described previously, the lock lever spring 17 is secured to the inside of the cassette holder 2, and a working arm 17a of the lock lever spring 17 projects outwardly from the side of the cassette holder 2 and is hooked onto a spring hooking portion 5c of the lock lever 5, thereby urging the lock lever 5 in the clockwise direction. As shown in FIG. 11B, the working arm 17a is bent in the direction of movement of the working arm 17a (parallel to the plane of the cassette 1) in such a manner that the lock lever spring 17 is prevented from coming off due to vibrations.

Figure 12A:
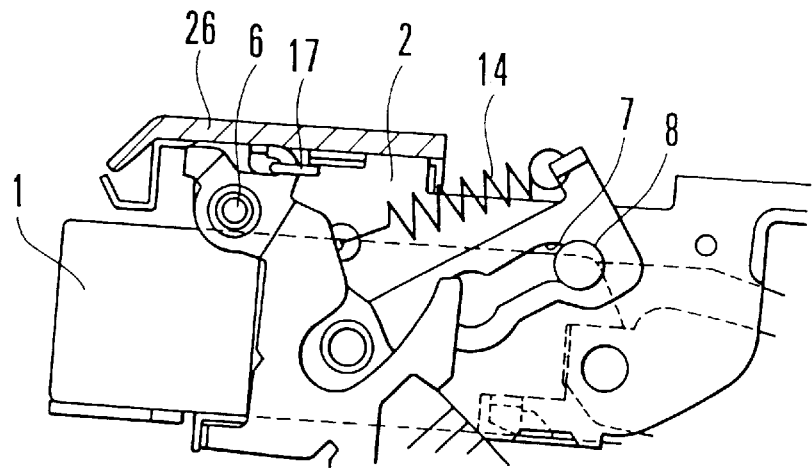
FIGS. 12A and 12B are schematic explanatory views of the essential portion of the present embodiment.
Figure 12B:
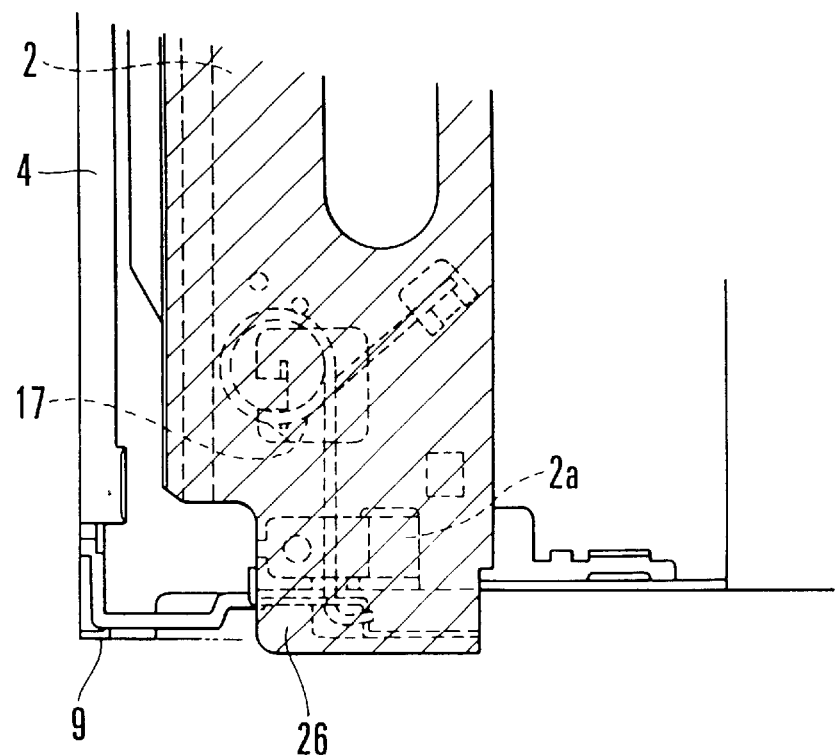
Figure 13A:
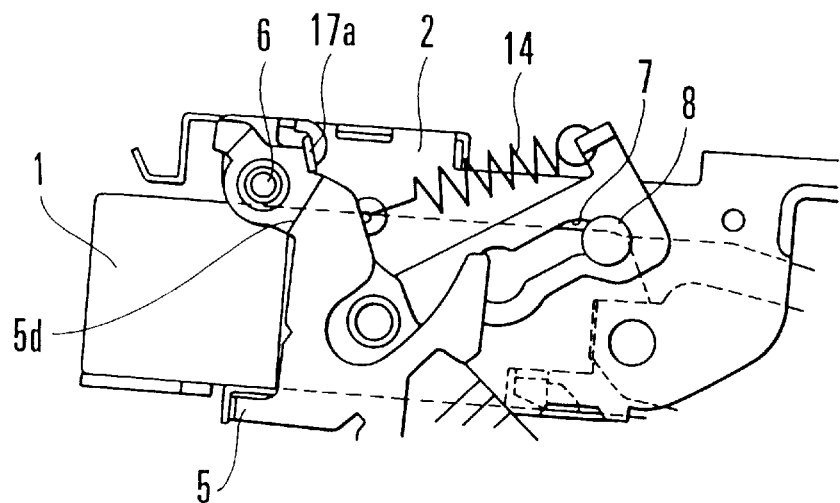
FIGS. 13A and 13B are schematic explanatory views of an essential portion of an improved example of the present embodiment.
Figure 13B:
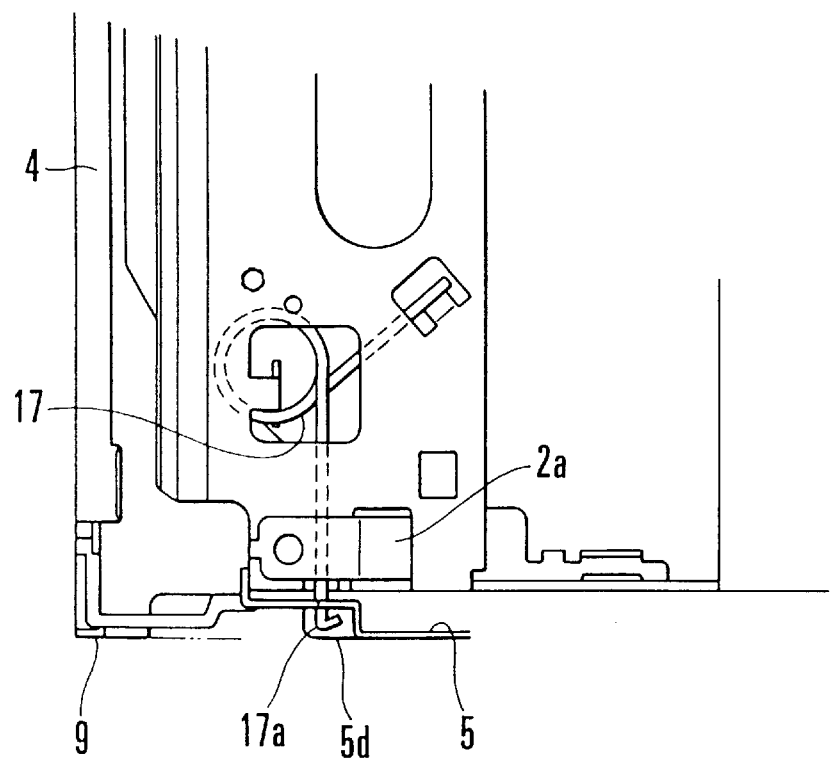
Figure 14A:
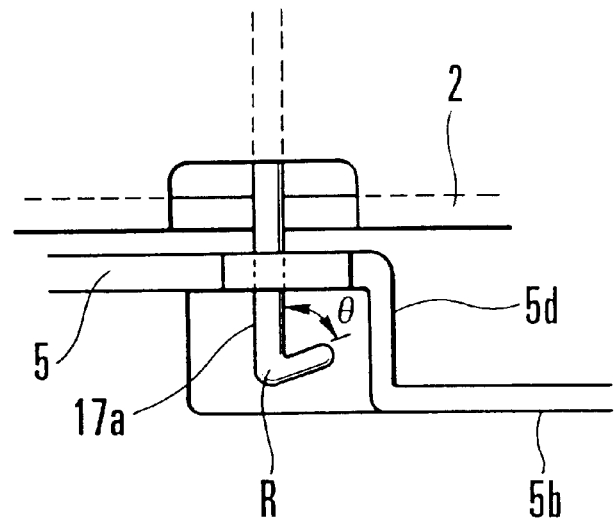
FIGS. 14A and 14B are schematic explanatory views of the essential portion of the improved example of the present embodiment.
Figure 14B:
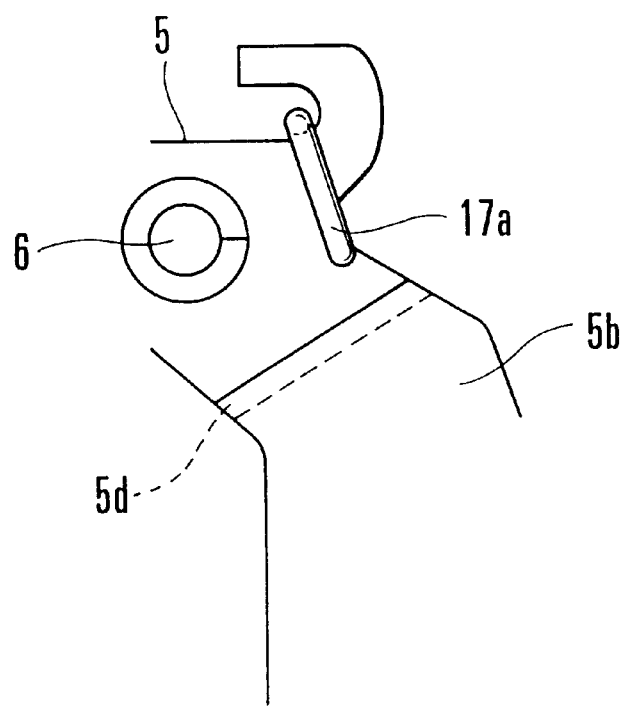

As shown in FIGS. 12A and 12B, a cover 26 (shown by hatching) is secured to the upper surface of the cassette holder 2. The cover 26 is intended to protect user's fingers from injuries due to the cassette holder 2 which is press-molded, edges of the cassette pressure springs 2a or a tip end of the working arm 17a of the lock lever spring 17, as well as to improve the external appearance of the cassette mounting device.

However, in the above-described cassette mounting device, as shown in FIG. 12B, it is necessary to extend the cover 26 from the upper surface of the cassette holder 2 like eaves so that the cover 26 can prevent user's fingers from touching the tip end of the working arm 17a of the lock lever spring 17 which urges the lock lever 5 to turn. This construction is a limitation in terms of design and a disadvantage to realization of far more miniaturized products.

In the improved example which will be described below, the working arm 17a of the lock lever spring 17 is bent in a direction toward a stepped portion of the lock lever 5 adjacent to the working arm 17a so that a tip edge of the working arm 17a is prevented from touching user's fingers.

FIGS. 13A, 13B and 14A, 14B show the improved example.

As shown in FIGS. 13A, 13B and 14A, 14B, the tip end of the working arm 17a of the lock lever spring 17 is bent from the working plane of the lock lever spring 17 toward a stepped portion 5d of the lock lever 5 adjacent to the working arm 17a. The height of a bent portion of the working arm 17a of the lock lever spring 17 is set to be lower than the height of the stepped portion 5d and an angle θ of the inside of the bent portion is made smaller than 90°, whereby the tip edge of the lock lever spring 17 is made lower than the root of the bent portion as viewed in the height direction of the stepped portion 5d. In this arrangement, even if a user's finger accidentally approaches the tip portion of the lock lever spring 17 while the user is operating the cassette holder 2, the finger merely touches a high surface (5b) of the stepped portion 5d of the lock lever 5 and an outside rounded portion (R) of the working arm 17a of the lock lever spring 17 without touching a sharp portion of the tip edge.

Accordingly, it is not necessary to extend the cover 25 over the working arm 17a.

Although in the above description of the improved example reference has been made to a torsion spring for urging the lock lever 5 of the cassette holder 2, the present invention can also be applied to a method of processing the tip end of an upward urging coil spring or the tip end of another spring disposed at a location near the cassette holder 2.

As described above, in accordance with this improved example, since the direction of bending of a tip end of a spring for urging a lever is opposed to a stepped portion of a lever adjacent to the tip end, it is possible to prevent a user's finger from touching the tip end portion of the spring. Accordingly, it is possible to omit a cover member for the tip end portion of the spring by a simple method without adding any special component part, and realize far more miniaturized products.

The following description is made in connection with the operation of opening the front lid 1a of the cassette 1 in the construction of the above-disclosed embodiment. In accordance with the construction of the embodiment, it is possible to prevent a drawback of the conventional construction, i.e., a possibility that a lid opener may be damaged when a cassette holder is moved down with a cassette being not fully inserted in the cassette holder. Before the opening operation of the lid 1a of the cassette 1 in the present embodiment is described, reference will be made to one example of a conventional lid opening operation.

Figure 15:
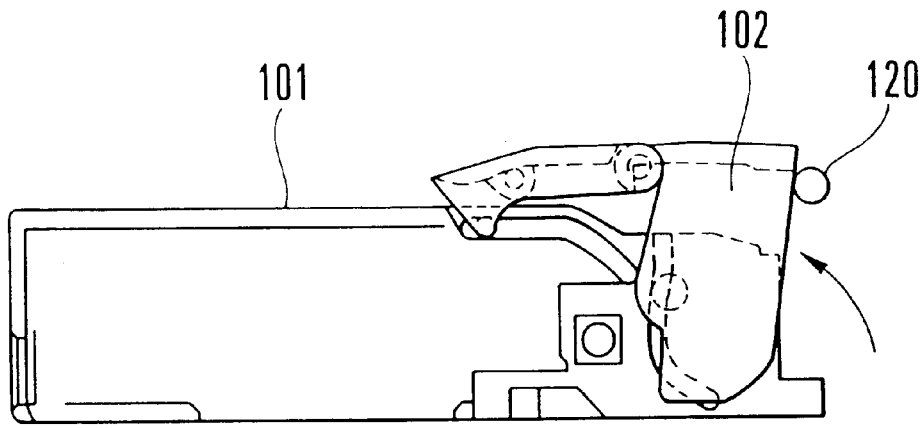
FIG. 15 is a side view showing a manner in which the front lid of a cassette is opened in a conventional cassette mounting device.

FIG. 15 shows the opened state of a cassette lid 102 of a cassette 101, and it is general practice that a lid opener 120 made of a shaft and the like fixed to a chassis opens the cassette lid 102 by a predetermined angle, thereby enabling tape to be drawn from the inside of the cassette 101. This method of opening the cassette lid 102 is widely used in various tape cassettes such as 8-mm VTR cassettes and VHS cassettes.

Figure 16:
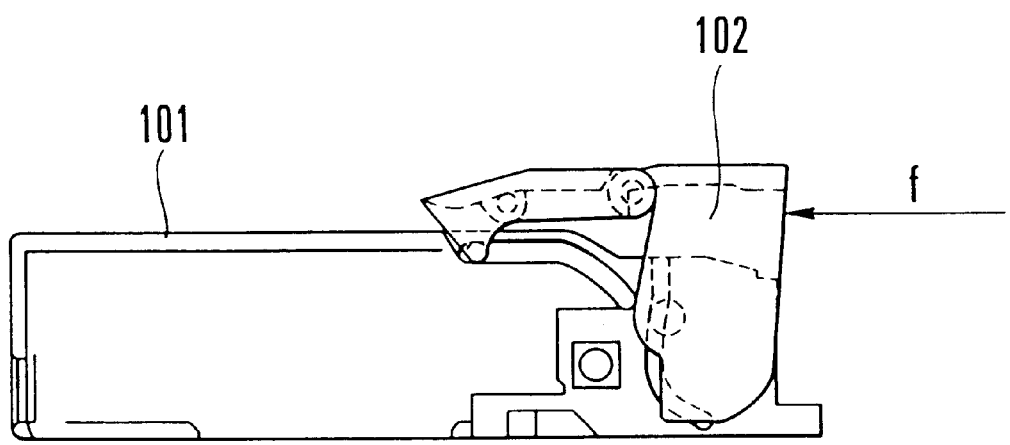
FIG. 16 is a side view showing another manner in which the front lid of the cassette is opened in the conventional cassette mounting device.

FIG. 16 shows one example which is arranged to open the cassette lid 102 of the cassette 101 to its movement limit. In this case, it is necessary to adopt a construction which opens the cassette lid 102 with a predetermined force f so that the dimensional dispersion of the cassette 101 can be absorbed. This example is useful in applications which make it necessary to open the cassette lid 102 as widely as possible so that the largest possible space can be used. Such opening method is prescribed in a cassette format for domestic-use digital VTRs.

Figure 17:
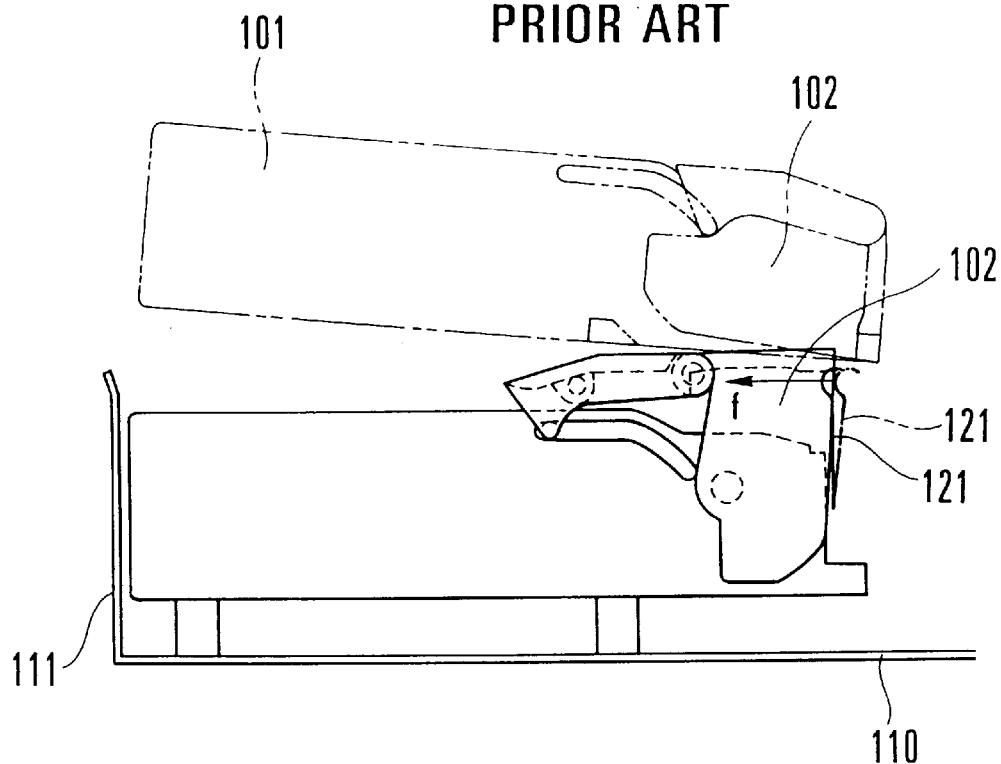
FIG. 17 is a schematic side view showing the opening operation of the front lid of the cassette in the conventional cassette mounting device.

FIG. 17 shows the latter example. Referring to FIG. 17, a lid opener 121 made from a leaf spring is fixed to a chassis 110, and a guide member 111 serves to guide the position of the back of the cassette 101. When a cassette holder is being moved downward, the cassette lid 102 of the cassette 101 starts to be opened by an upper portion of the lid opener 121 (as shown by a solid line), and when the cassette holder reaches a recording/reproducing position, the cassette lid 102 is opened by a side portion of the lid opener 121 (as shown by a two-dot chain line). When the cassette lid 102 is fully opened, the lid opener 121 which is made from a leaf spring deflects by a predetermined amount and holds the cassette lid 102 in an open state with an opening pressure force f.

Figure 18:
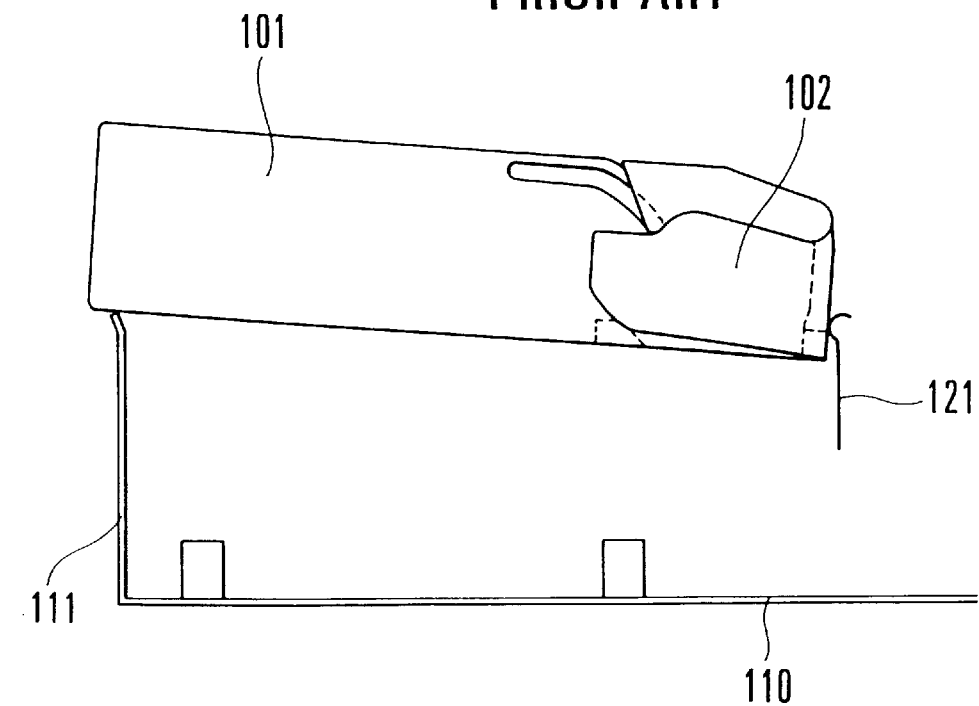
FIG. 18 is a schematic side view showing a state in which the cassette is moved downwardly with the cassette being incompletely inserted in the conventional cassette mounting device.

The function of the guide member 111 will be described below. FIG. 18 shows a case where the cassette holder is moved down with the cassette 101 being not fully inserted in the cassette holder. In this case, if the cassette 101 lies at a position where the cassette lid 102 does not engage with the lid opener 121, the guide member 111 functions as a stopper so that the cassette 101 cannot be loaded, and the guide member 111 also functions to guide the back of the cassette 101 so that the cassette 101 can be correctly loaded even if there is a certain extent of positional deviation between the cassette 101 and the cassette holder.

However, in the arrangement in which an elastic member is used for the lid opener 121, if the cassette holder is forcedly moved down with the cassette 101 being not fully inserted in the cassette holder, there is the problem that the lid opener 121 may be damaged.

Figure 19:
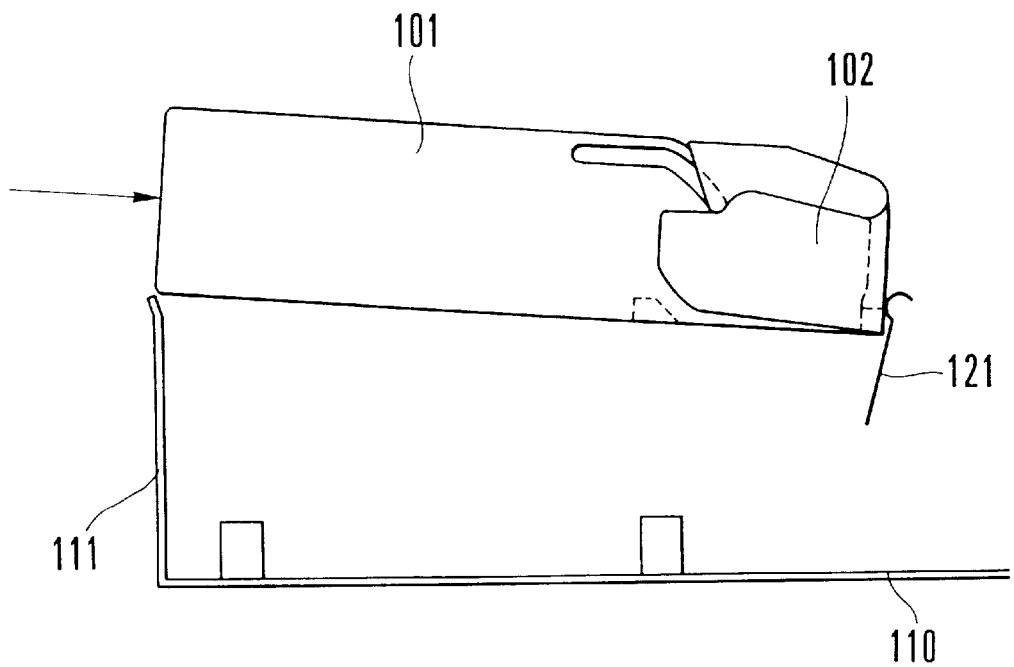
FIG. 19 is a schematic side view showing a state in which the cassette in the state shown in FIG. 18 is pressed from the rearward direction.
Figure 20:
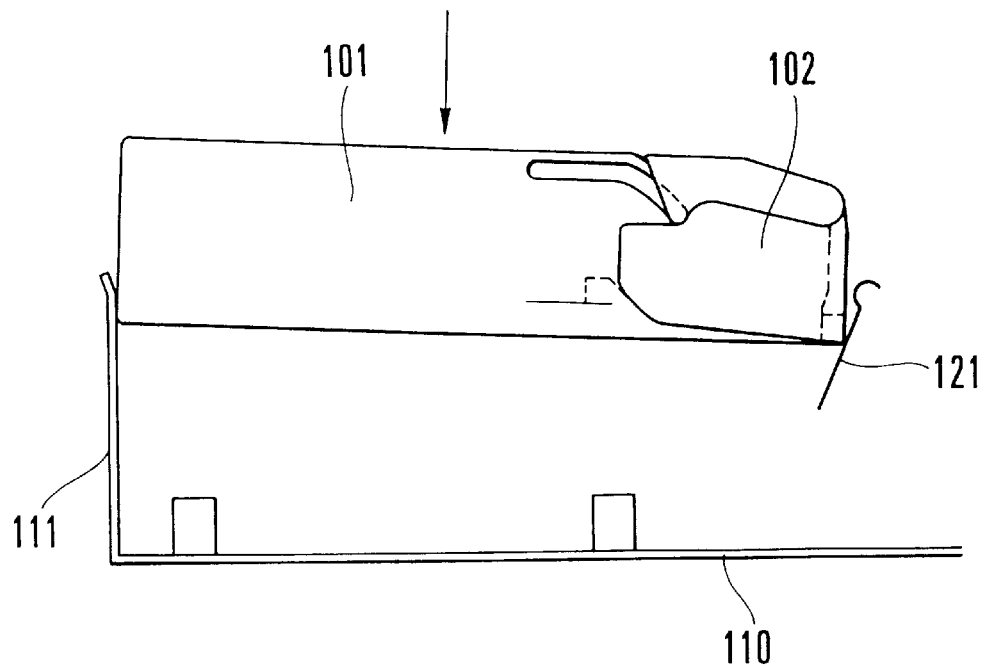
FIG. 20 is a schematic side view showing a state in which the cassette in the state shown in FIG. 19 is moved downwardly.

For example, if the cassette 101 in the state shown in FIG. 18 is pressed from the rearward direction as indicated by the arrow shown in FIG. 19, the lid opener 121 deflects and the back of the cassette 101 passes the top end of the guide member 111, so that the cassette holder can be moved downwardly. If the cassette holder is forced to move further downwardly from this state (FIG. 20), the lid opener 121 exceeds the limit of its elastic deformation and may be broken (i.e., permanently set in fatigue). In addition, if the cassette 101 is moved down to the body of a recording and/or reproducing apparatus with the cassette lid 102 remaining closed, damage may occur in a tape loading mechanism (not shown) or the like.

The operation of opening the front lid 1a of the cassette 1 will be described below.

Referring to FIGS. 6 and 7, a lid opener 25 is made from a leaf spring, and the cassette stopper 20 according to the present invention is provided integrally with the movable base 11. As is apparent from FIGS. 5 and 8 as well, this cassette stopper 20 is designed to enter into the opening 1b of the front lid 1a of the cassette 1 in a popped-up state which allows mounting of the cassette 1, and, therefore, does not at all hinder the insertion of the cassette 1. Furthermore, as the cassette 1 moves downward, the front lid 1a opens upwardly by the action of the lid opener 25, so that the cassette stopper 20 does not interfere with the cassette 1 even during the downward movement of the cassette 1 (FIG. 7).

As shown in FIG. 5 as well, if the cassette 1 is completely inserted in the cassette holder 2, the front-lid unlocking portion 2b for the cassette 1, which is integrally provided on the cassette holder 2, turns the front-lid lock lever 1c clockwise and releases the locked state of the front lid 1a.

As shown in FIG. 6, if the cassette 1 is moved downward with the cassette 1 being not fully inserted in the cassette holder 2, the front plate portion 1d of the front lid 1a of the cassette 1 tends to move downward without engaging with the lid opener 25 nor the cassette stopper 20. However, the rear end portion 1e of the cassette 1 interferes with the upper end portion 4a of the connecting member 4 and the cassette 1 is inhibited from moving downward further. Even if the cassette 1 is to be pressed more in the direction of the arrow shown in FIG. 6, the cassette stopper 20 comes into abutment with the front plate portion 1d so that the cassette 1 is not allowed to move further, whereby it is possible to prevent the cassette 1 from being incorrectly inserted with the front lid 1a of the cassette 1 remaining closed.

By adopting the above-described construction, it is possible to fully open the front lid 1a of the cassette 1 to its moving angle limit, whereby it is possible to utilize the obtained space to the maximum.

Incidentally, although, in the above description of the embodiment, reference has been made to the example in which the cassette stopper 20 is provided integrally with the movable base 11 to reduce the number of component parts, the cassette stopper 20 can also be formed as a separate component part. In addition, even if the lid opener 25 is formed not by the leaf spring but by a plurality of mechanism components including a coil spring and the like, the lid opener 25 can, of course, perform a similar function and effect.

In the present embodiment, when the cassette mounting device is to be secured to the movable base 11, the shaft 10 of the lever 3 is first brought into engagement with the cam slot 12 of the movable base 11 from above the movable base 11. Then, the connecting member 4 is inserted into the movable base 11 from above while pressing the movable base 11 to expand it by means of its elasticity, and the projection 9 of the connecting member 4 is brought into engagement with the hole 13 of the movable base 11. Finally, the fixing member 21 is secured to the connecting member 4 to clamp the movable base 11 and the connecting member 4 by means of the support portion 21a of the fixing member 21, whereby the connecting member 4 is turnably secured to the movable base 11. In this manner, the cassette mounting device can be easily secured to the movable base 11 from one direction (from above).

Although, in the above description of the embodiment, reference has been made to the example in which the lock lever spring 17 for urging the lock lever 5 to turn is made from a torsion coil spring, an extension or compression spring or the like may also be used.

Although, in the above description of the embodiment, reference has been made to the example in which a shaft which defines an axis of rotation is provided on the connecting member 4 and a corresponding hole is provided in the movable base 11, these shaft and hole may also be provided in the opposite relation to the above-described one.

Although, in the above description of the embodiment, reference has been made to the example in which the fixing member 21 for fixing the connecting member 4 and the movable base 11 is a molded product made of plastic and the fixing member 21 is secured to the connecting member 4 by means of its elasticity, a fixing member made of metal may also be secured to the connecting member 4 as the fixing member 21 by its elasticity. Further, the fixing member 21 may also be secured to an appropriate portion of the movable base 11.

What is claimed is:
1. A cassette mounting device comprising:
 (a) a chassis having a pair of side plates disposed thereon;
 (b) a cassette holder for holding a cassette inserted through an opening part; and
 (c) a link mechanism for movably supporting said cassette holder between the side plates in an upward and downward direction with respect to said chassis, said link mechanism including a supporting member comprising a pair of link parts having engaging parts for rotatably supporting said link parts on said side plates respectively by engaging with engaging portions formed on said side plates and an interconnecting part for interconnecting said link part and for synchronizing said link parts with each other,
wherein said interconnecting part is located in the side of said opening part of said cassette holder and near said engaging parts.

2. A cassette mounting device according to claim 1, wherein said engaging parts of said link parts are formed on each one side of said link parts near to the interconnecting part.

3. A cassette mounting device according to claim 1, wherein said engaging parts of said link parts are projections or concaves.

4. A cassette mounting device according to claim 1, wherein said link parts are formed by bending both sides of said supporting member at a right angle respectively.

5. A cassette mounting device according to claim 1, further comprising a clipping member which sandwiches the side plate and the link part so as to keep a state that the link part and the side plate are engaged and movably connected each other.

6. A cassette mounting device according to claim 5, wherein said clipping member is elastic.

7. A cassette mounting device according to claim 5, wherein said clipping member is a molded product made of plastic.

8. A recording and/or reproducing apparatus, comprising:
 (a) a rotary drum device;
 (b) a fist chassis to which at least said rotary drum device is secured;
 (c) a second chassis arranged to be slidable with respect to said first chassis and disposed thereon a pair of side plates and reel mounts;
 (d) a cassette holder for holding a cassette inserted trough an opening part; and
 (e) a link mechanism for movably supporting said cassette holder between the side plates in an upward and downward direction with respect to said second: chassis, said link mechanism including a supporting member comprising a pair of link parts having engaging parts for rotatably supporting said link parts on said side plates respectively by engaging with engaging portions formed on said side plates and an interconnecting part for interconnecting said link parts and for synchronizing said link parts with each other,
wherein said interconnecting part is located in the side of said opening part of said cassette holder and near said engaging parts.

9. A recording and/or reproducing apparatus according to claim 8, being arranged to move down said cassette holder in which the cassette is inserted, from an up position to a down position, mount the cassette on the reel mounts of said second chassis, relatively slide said second chassis with respect to said first chassis, relatively insert at least part of said rotary drum device into an opening part of the cassette, sand wrap tape around a periphery of a drum of said rotary drum device.

10. A recording and/or reproducing apparatus according to claim 8, wherein said engaging parts of said link parts are formed on each one side of said link parts near to the interconnecting part.

11. A recording and/or reproducing apparatus according to claim 8, wherein said engaging parts of said link parts are projections or concaves.

12. A cassette mounting device according to claim 8, wherein said link parts are formed by bending both sides of said supporting member at a right angle respectively.

13. A cassette mounting device comprising:
    (a) a cassette holder into which to insert a cassette;
    (b) a pair of link mechanisms disposed on lateral opposed sides of said cassette holder so that said cassette holder is supported for upward and downward movement with respect to a chassis; and
    (c) a fixing member which fixes each of said pair of link mechanisms to the chassis, said fixing member clamping each of said pair of link mechanisms turnably with respect to the chassis.

14. A cassette mounting device according to claim 13, wherein said fixing member is fixed to a link member of each of said pair of link mechanisms and is capable of turning integrally with the link member.

15. A cassette mounting device according to claim 13, wherein said fixing member is secured by means of elasticity thereof.

16. A cassette mounting device according to claim 13, wherein said fixing member is a molded product made of plastic.

17. A cassette mounting device according to claim 13, wherein said pair of link mechanisms are formed integrally with a connecting member.

18. A recording and/or reproducing apparatus having a cassette mounting device according to claim 13, comprising:
    (a) a rotary drum device;
    (b) a first chassis to which at least said rotary drum device is secured; and
    (c) a second chassis having at least said cassette mounting device and reel mounts and arranged to be slidable with respect to said first chassis.

19. A recording and/or reproducing apparatus according to claim 18, being arranged to move down a cassette holder in which a cassette is inserted, from an up position to a down position, mount the cassette on the reel mounts of said second chassis, relatively slide said second chassis with respect to said first chassis, relatively insert at least part of said rotary drum device into an opening of the cassette, and wrap tape around a periphery of a drum of said rotary drum device.

20. A cassette mounting device comprising:
    (a) a chassis having a pair of side plates disposed thereon;
    (b) a cassette holder for holding a cassette inserted through an opening part;
    (c) a pair of link mechanisms disposed on said side plates so hat said cassette holder is supported for upward and downward movement with respect to the chassis; and
    (d) a connecting member for causing said pair of link mechanisms to move at the same time, said connecting member is located between said side plates and on the side of said opening part of said cassette holder, and wherein said connecting member and link members of said pair of link mechanisms are integrated and supported turnably with respect to the chassis.

21. A cassette mounting device according to claim 20, wherein said connecting member and the link members are formed as an integrated component part by press-working a metal plate.

22. A cassette mounting device according to claim 21, wherein guide means for guiding turning of the integrated component part with respect to the chassis is provided integrally with each of the integrated component part and the chassis.

23. A cassette mounting device according to claim 22, wherein said guide means includes a hole provided in either one of the integrated component part and the chassis and a shaft provided on the other one.

24. A recording and/or reproducing apparatus having a cassette mounting device according to claim 20, comprising:
    (a) a rotary drum device;
    (b) a first chassis to which at least said rotary drum device is secured; and
    (c) a second chassis having at least said cassette mounting device and reel mounts and arranged to be slidable with respect to said first chassis.

25. A recording and/or reproducing apparatus according to claim 24, being arranged to move down a cassette holder in which a cassette is inserted, from an up position to a down position, mount the cassette on the reel mounts of said second chassis, relatively slide said second chassis with respect to said first chassis, relatively insert at least part of said rotary drum device into an opening of the cassette, and wrap tape around a periphery of a drum of said rotary drum device.

* * * * *

UNITED STATES PATENT AND TRADEMARK OFFICE
CERTIFICATE OF CORRECTION

PATENT NO. : 6,624,965 B1
DATED : September 23, 2003
INVENTOR(S) : Kiyoshi Kumagai et al.

It is certified that error appears in the above-identified patent and that said Letters Patent is hereby corrected as shown below:

Column 4,
Line 32, delete "base 1 land" and insert -- base 11 and --.

Column 10,
Line 14, delete "part" and insert -- parts --.
Line 47, delete "trough" and insert -- through --.
Line 51, delete "second:" and insert -- second --.

Column 12,
Line 10, delete "hat" and insert -- that --.

Signed and Sealed this

Twenty-second Day of June, 2004

JON W. DUDAS
*Acting Director of the United States Patent and Trademark Office*